(12) United States Patent
Xiang

(10) Patent No.: US 9,531,183 B2
(45) Date of Patent: Dec. 27, 2016

(54) CIRCUIT AND METHOD OF OVER-VOLTAGE PROTECTION

(71) Applicant: Zhiyong Xiang, Shenzhen (CN)

(72) Inventor: Zhiyong Xiang, Shenzhen (CN)

(73) Assignee: HUIZHOU KIMREE TECHNOLOGY CO., LTD. SHENZHEN BRANCH, Shenzhen (CN)

( * ) Notice: Subject to any disclaimer, the term of this patent is extended or adjusted under 35 U.S.C. 154(b) by 695 days.

(21) Appl. No.: 13/870,791

(22) Filed: Apr. 25, 2013

(65) Prior Publication Data

US 2014/0285937 A1    Sep. 25, 2014

(30) Foreign Application Priority Data

Mar. 20, 2013 (CN) ...................... 2013 2 0130313 U

(51) Int. Cl.
    *H02H 3/20* (2006.01)
(52) U.S. Cl.
    CPC ..................... *H02H 3/202* (2013.01)
(58) Field of Classification Search
    USPC ......................................... 361/91.1
    See application file for complete search history.

(56) References Cited

U.S. PATENT DOCUMENTS

| | | | | |
|---|---|---|---|---|
| 3,048,718 A * | 8/1962 | Starzec | ................... | G05F 1/571 323/303 |
| 3,571,608 A * | 3/1971 | Hurd | ..................... | H02H 3/202 307/127 |
| 4,562,454 A * | 12/1985 | Schultz | ............... | H01L 27/0248 257/363 |
| 4,723,191 A * | 2/1988 | Menniti | .................. | G05F 1/571 330/298 |
| 4,945,444 A * | 7/1990 | Schwertlein | ............ | G05F 1/569 307/127 |
| 6,611,410 B1 * | 8/2003 | Makaran | ............... | H02H 11/003 307/127 |
| 6,816,348 B2 * | 11/2004 | Chen | .................... | H02H 11/002 361/56 |
| 7,274,543 B2 * | 9/2007 | Nishikawa | .......... | H01L 27/0266 361/56 |

(Continued)

*Primary Examiner* — Ronald W Leja
(74) *Attorney, Agent, or Firm* — Tim Tingkang Xia, Esq.; Locke Lord LLP

(57) ABSTRACT

A circuit and method of over-voltage protection is provided to prevent the power supply to provide an exorbitant voltage to the electronic cigarette, the electronic cigarette case or the electronic cigarette charger; said circuit comprises a DC input terminal, a DC output terminal, a voltage sampling circuit, a switch control circuit and a switch circuit; the voltage sampling circuit is electrically connected with the DC input terminal and the switch control circuit respectively; the switch control circuit is electrically connected with the switch circuit; the switch circuit is electrically connected with the DC input terminal, the DC output terminal and the switch control circuit respectively. When implementing the present invention, an exorbitant voltage can be prevented to provide to the electronic cigarette, the electronic cigarette case or the electronic cigarette charger by the power supply, thus being protected from over-voltage as the exorbitant voltage may damage the products.

4 Claims, 3 Drawing Sheets

(56) References Cited

U.S. PATENT DOCUMENTS

| | | | | |
|---|---|---|---|---|
| 8,755,161 B2* | 6/2014 | James | ............... | H02H 3/207 361/91.1 |
| 2002/0109952 A1* | 8/2002 | Rapsinski | ............... | H02H 9/042 361/86 |
| 2009/0097181 A1* | 4/2009 | Tamegai | ............... | H02J 7/0029 361/91.5 |
| 2009/0154039 A1* | 6/2009 | Tsugawa | ............... | H02H 3/202 361/56 |
| 2012/0200300 A1* | 8/2012 | Lamb | ............... | H02H 3/20 324/537 |
| 2013/0107406 A1* | 5/2013 | Johnson | ............... | H02H 3/202 361/84 |
| 2013/0335873 A1* | 12/2013 | Lee | ............... | H02H 9/041 361/91.2 |
| 2014/0285937 A1* | 9/2014 | Xiang | ............... | H02H 3/202 361/91.2 |

* cited by examiner

CIRCUIT AND METHOD OF OVER-VOLTAGE PROTECTION

CROSS-REFERENCE TO RELATED APPLICATIONS

This non-provisional application claims priority under 35 U.S.C. §119(a) on Patent Application No. 201320130313.X filed in P.R. China on Mar. 20, 2013, the entire contents of which are hereby incorporated by reference.

FIELD OF THE INVENTION

The present invention relates to the field of electronic cigarettes, more specifically, relates to a circuit and method of over-voltage protection for preventing the power supply to provide an exorbitant voltage to the electronic cigarette, the electronic cigarette case or the electronic cigarette charger.

BACKGROUND OF THE INVENTION

At present, there are not over-voltage protection for the input setion in most of the chargeable electronic cigarettes and the accessories thereof (such as the electronic cigarette cases and the electronic cigarette chargers). For example, when the charging voltage being added to 10V, an electronic cigarette, whose charging interface only can receive an input of 5V, may damage because of having no over-voltage protection and this high voltage, and more seriously, may cause fire accident.

Although some electronic cigarettes and the accessories thereof use varistors or TVSs to provide the over-voltage protection for a short time, the varistors and TVSs can't bear if the high voltage last for a long time. So the electronic cigarettes and the accessories thereof can't be protected from the long-lasting high input voltage.

BRIEF SUMMARY OF THE INVENTION

The objective of the present invention is to provide a circuit and method of over-voltage protection for preventing the power supply to provide an exorbitant voltage to the electronic cigarette, the electronic cigarette case or the electronic cigarette charger, aiming at the drawbacks that there are no over-voltage protection or the over-voltage protecting time is too short in above electronic cigarettes and the accessories thereof in the prior art.

The technical solutions to solve the technical problem are as follows:

A circuit of over-voltage protection used to prevent the power supply to provide an exorbitant voltage to the electronic cigarette, the electronic cigarette case or the electronic cigarette charger is provided, said circuit comprises a DC input terminal, a DC output terminal, a voltage sampling circuit, a switch control circuit and a switch circuit; the voltage sampling circuit is electrically connected with the DC input terminal and the switch control circuit respectively; the switch control circuit is electrically connected with the switch circuit; the switch circuit is electrically connected with the DC input terminal, the DC output terminal and the switch control circuit respectively;

the DC input terminal is used to receive direct current from the power supply;

the DC output terminal is used to output direct current;

the voltage sampling circuit is used to sampling the voltage of the DC input terminal;

the switch control circuit is used to control the conductive or cutoff of the switch circuit;

the switch circuit is used to output the direct current from the DC input terminal to the DC output terminal or not based on the control of the switch control circuit.

Advantageously, said voltage sampling circuit comprises a first resistance; the switch control circuit comprises a first triode and a second resistance; the switch circuit comprises a first MOSFET;

one pin of the first resistance is respectively connected with the positive pole of the DC input terminal and the emitter of the first triode; the other pin of the first resistance is connected with the base of the first triode; the emitter of the first triode is respectively connected with the positive pole of DC input terminal and the source of the first MOSFET; the collector of the first triode is respectively connected with the grid of the first MOSFET and the second resistance; the source of the first MOSFET is connected with the positive pole of the DC input terminal, the drain of the first MOSFET is connected with the positive pole of the DC output terminal, and the grid of the first MOSFET is connected with one pin of the second resistance; the other pin of the second resistance is respectively connected with the ground and the negative pole of the DC output terminal;

when the sampling voltage on the first resistance is over the base-emitter threshold voltage of the first triode, the first triode is conductive to cut off the first MOSFET so that the DC output terminal can't be powered.

Advantageously, said voltage sampling circuit also comprises a first voltage-regulator diode; the positive pole of the first voltage-regulator diode is respectively connected with the ground and the negative pole of the DC input terminal, and its negative pole respective is respectively connected with the base of the first triode and the first resistance.

Advantageously, said first MOSFET is a P channel MOSFET, and said first triode is a PNP triode.

Advantageously, said voltage sampling circuit comprises a third resistance; said switch control circuit comprises a second triode and a fourth resistance; said switch circuit comprises a second MOSFET;

one pin of the third resistance is respectively connected with the ground and the negative pole of the DC input terminal, and the other pin of the third resistance is connected with the base of the second triode; the emitter of the second triode is respectively connected with the ground and the negative pole of the DC input terminal, and its collector is respectively connected with the grid of the second MOSFET and the forth resistance; the source of the second MOSFET is respectively connected with the negative pole of the DC input terminal and the emitter of the second triode, its drain is connected with the negative pole of the DC output terminal, and its grid is connected with one pin of the forth resistance; the other pin of the forth resistance is respectively connected with the positive pole of the DC input terminal and the negative pole of the DC output terminal;

when the sampling voltage on the third resistance is over the base-emitter threshold voltage of the second triode, the second triode is conductive to cut off the second MOSFET so that the DC output terminal can't be powered.

Advantageously, said voltage sampling circuit also comprises a second voltage-regulator diode; the negative pole of the second voltage-regulator diode is connected with the positive pole of the DC input terminal and its positive pole is respectively connected with the base of the second triode and the third resistance.

Advantageously, said second MOSFET is an N channel MOSFET, and said second triode is an NPN triode.

Advantageously, said switch control circuit comprises a comparator; said switch circuit comprises a semiconductor switch; said semiconductor switch comprises a first pin, a second pin and a third pin;

said voltage sampling circuit is connected with the DC input terminal; the first input of said comparator is connected with a reference voltage, the second input of it is connected with said voltage sampling circuit, and the output of it is connected with the first pin of said semiconductor switch, the second pin of the semiconductor switch is connected with the positive pole of the DC input terminal, and the third pin of said semiconductor switch is connected with the positive pole of the DC output terminal;

if the voltage received by the second input of the comparator is over the reference voltage at the first input of the comparator, said comparator control said semiconductor switch to be cut-off so that the DC output terminal can't be powered.

Advantageously, the type of said comparator is LM393; said semiconductor switch is a triode, said first pin is the base of the triode, said second pin is the emitter of the triode, and said third pin is the collector of the triode.

Advantageously, said semiconductor switch is a thyristor, and said first pin is the gate pole of the thyristor, said second pin is the positive pole of the thyristor, and said third pin is the negative pole of the thyristor.

A method of over-voltage protection used to prevent the power supply to provide an exorbitant voltage to the electronic cigarette the electronic cigarette case or the electronic cigarette charger is also provided, said method comprises:

receiving direct current from the power supply;
sampling the voltage of said direct current;
comparing said sampling voltage with a preset voltage;
when the sampling voltage is over the preset voltage, making power supply not to provide power to the electronic cigarette, the electronic cigarette case or the electronic cigarette charger;
when the sampling voltage is within the range of the preset voltage, providing the direct current to the electronic cigarette, the electronic cigarette case or the electronic cigarette charger.

Advantageously, the step of sampling the voltage of said direct current comprises dividing the voltage of the direct current input to produce said sampling voltage.

When implementing the circuit and method of over-voltage protection of the present invention, the following advantageous effects can be achieved: preventing the power supply to provide an exorbitant voltage to the electronic cigarette, the electronic cigarette case or the electronic cigarette charger, thus protecting the electronic cigarette, the electronic cigarette case or the electronic cigarette charger from over-voltage and preventing them to be damaged by the exorbitant voltage. Besides, the reliability and safety of the electronic cigarette, the electronic cigarette case or the electronic cigarette charger can be improved.

BRIEF DESCRIPTION OF THE DRAWINGS

The present invention will be further described with reference to the accompanying drawings and embodiments in the following, in the accompanying drawings.

DETAILED DESCRIPTION OF THE PREFERRED EMBODIMENT

To make the objects, technical schemes and advantages more clearly, the present invention may be further described in detail with reference to the accompanying drawings and embodiments. The present invention can be used in the field of the electronic cigarette, the electronic cigarette case and the electronic cigarette charger to prevent the power supply to provide an exorbitant voltage to the electronic cigarette, the electronic cigarette case or the electronic cigarette charger, thus protecting them from over-voltage and improving their reliability and safety. In the present invention, the power supply may be an adapter source or a portable source.

Figure 1:
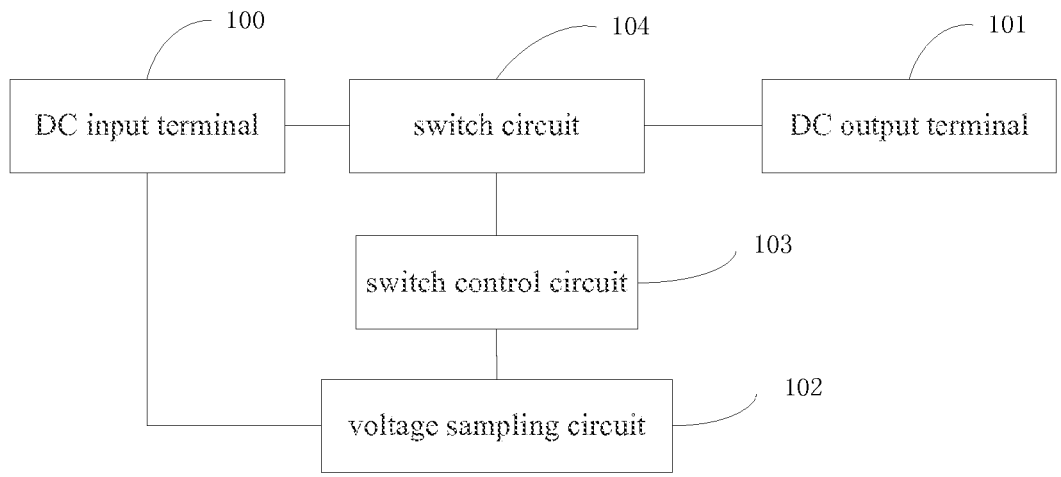
FIG. 1 is a block diagram for the circuit of over-voltage protection of the present invention.

FIG. 1 is a block diagram for the circuit of over-voltage protection of the present invention. Said over-voltage protection circuit comprises a DC input terminal 100, a DC output terminal 101, a voltage sampling circuit 102, a switch control circuit 103 and a switch circuit 104.

The voltage sampling circuit 102 is electrically connected with the DC input terminal 100 and the switch control circuit 103 respectively. The switch control circuit 103 is electrically connected with the switch circuit 104. The switch circuit 104 is electrically connected with the DC input terminal 100, the DC-output terminal 101 and the switch control circuit 103 respectively.

Wherein, the DC input terminal 100 is used to receive a direct current from the power supply. The DC output terminal 200 is used to output the direct current. The voltage sampling circuit 102 is used to sampling the voltage of the DC input terminal 100. The switch control circuit 103 is used to control the switch circuit 104 to be cut-off when the sampling voltage of the voltage sampling circuit 102 is over the preset voltage, otherwise control the switch circuit 104 to be conductive. The preset voltage is preset based on the actual situation. For example, the preset voltage is 4.2V, 5V, 6V or other voltage values needed. In addition, the preset voltage is related to the components used in the switch control circuit 103. For example, if the switch control circuit 103 comprises a triode, the preset voltage may be the base-emitter threshold voltage of the triode. So it is needed to control the sampling voltage of the voltage sampling circuit 102 in order to control the switch circuit 104 not to power the DC output terminal 101 when the sampling voltage is over the base-emitter threshold voltage of the triode.

The switch circuit 104 is used to output the direct current from the DC input terminal 100 to the DC output terminal 101 based on the control of the switch control circuit 103. And the switch circuit 104 is also used to stop the DC input terminal 100 powering to the DC output terminal 101 based on the control of switch control circuit 103. The switch circuit 104 may comprise one or more of a MOSFET, a triode, a thyristor or a transistor.

In the present invention, the sampling voltage of the DC input terminal 100 is compared with the preset voltage. When said sampling voltage is below or equal to the preset voltage, the switch control circuit 103 control the switch circuit 104 to be conductive so that the DC input terminal 100 can communicate with the DC-output terminal 101 to power the electronic cigarette, the electronic cigarette case or the electronic cigarette charger. But when said sampling voltage is over the preset voltage, the switch circuit 104 is cut-off so that the electronic cigarette, the electronic cigarette case or the electronic cigarette charger will not be powered. Thus, the over-voltage protection can be realized.

Figure 2:
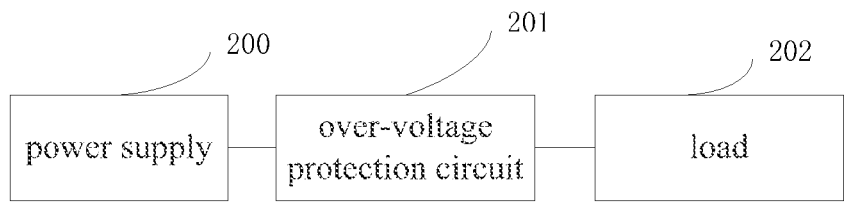
FIG. 2 is the connect relation for the circuit of over-voltage protection and the electronic cigarette, the electronic cigarette case or the electronic cigarette charger of the present invention.

FIG. 2 shows the connect relation for the circuit of over-voltage protection and the electronic cigarette, the electronic cigarette case or the electronic cigarette charger of the present invention. In the present invention, the circuit of over-voltage protection 201 is connected between the power supply 200 and the load 202 when in use, so as to get through or cut off the powering path between the power supply and the electronic cigarette or the accessories thereof to protect them from over-voltage. Wherein, the load 202 comprises devices needed to be powered such as a electronic cigarette, a electronic cigarette case or a electronic cigarette charger.

If the circuit of over-voltage protection 201 is used to prevent the power supply 200 to provide an exorbitant voltage to the electronic cigarette, the DC-output terminal 101 of the circuit 201 is electrically connected with a corresponding supply circuit in the electronic cigarette.

If the circuit of over-voltage protection 201 is used to prevent the power supply 200 to provide an exorbitant voltage to the electronic cigarette case, the DC-output terminal 101 of the circuit 201 is electrically connected with a corresponding supply circuit in the electronic cigarette case.

If the circuit of over-voltage protection 201 is used to prevent the power supply 200 to provide an exorbitant voltage to the electronic cigarette charger, the DC-output terminal 101 of the circuit 201 is electrically connected with a corresponding supply circuit in the electronic cigarette charger.

Figure 3:
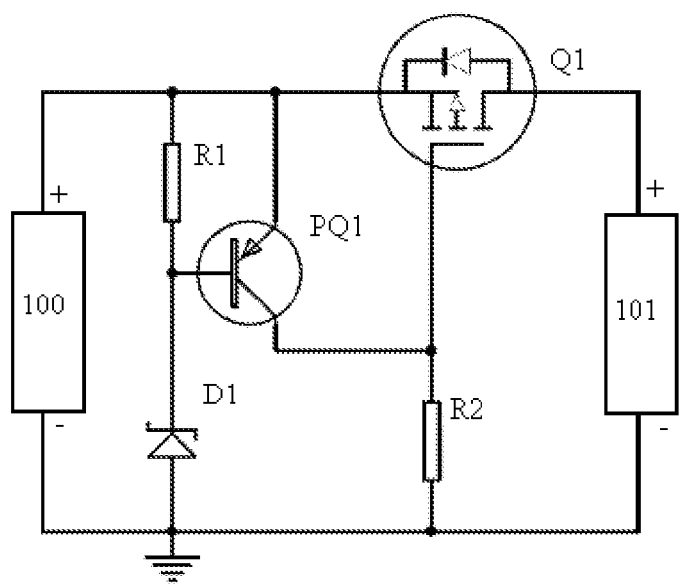
FIG. 3 is a circuit diagram for the circuit of over-voltage protection of the first embodiment of the present invention.

FIG. 3 is a circuit diagram for over-voltage protection circuit of the first embodiment of the present invention. In the first embodiment of the present invention, the voltage sampling circuit 102 comprises a resistance R1 and a voltage-regulator diode D1. The switch control circuit 103 comprises a triode PQ1 and a resistance R2. The switch circuit 104 comprises a MOSFET Q1. The MOSFET Q1 is a P channel MOSFET.

Wherein, one pin of the resistance R1 is connected with the positive pole of the DC input terminal 100 and the emitter of the triode PQ1. The other pin of the resistance R1 is connected with the base of the triode PQ1. The emitter of the triode PQ1 is respectively connected with the positive pole of DC input terminal and the source of the MOSFET Q1. The collector of the triode PQ1 is respectively connected with the grid of the MOSFET Q1 and the resistance R2. The source of the MOSFET Q1 is connected with the positive pole of DC input terminal 100. The drain of the MOSFET Q1 is connected with the positive pole of DC output terminal 101. And the grid of the MOSFET Q1 is connected with one pin of the resistance R2. The other pin of the resistance R2 is respectively connected with the ground and the negative pole of the DC output terminal.

When the sampling voltage on the resistance R1 is over the base-emitter voltage of the triode PQ1, the triode PQ1 is conductive to cut off the MOSFET Q1 in the switch circuit 104 so that the DC output terminal 101 won't be powered.

The positive pole of the voltage-regulator diode D1 is respectively connected with the ground and the negative pole of the DC input terminal. The negative pole of the voltage-regulator diode D1 is respectively connected with the base of the triode Q1 and the resistance R1. The voltage-regulator diode D1 can make the voltage stable when the power supply or the load is changing to a substantial extent.

In the working process, the input of the direct current from the power supply produces a sampling voltage on the resistance R1 and the sampling voltage will be compared with the base-emitter threshold voltage (regarded as the preset voltage) by the PNP triode PQ1. If the sampling voltage is over the preset voltage, the sampling voltage will turn on the triode PQ1 and the collector of the triode PQ1 will be at a high level voltage. As a result, the grid of the MOSFET Q1 is at a high level voltage and the MOSFET Q1 is cut off, so that the powering path between the power supply and the electronic cigarette, the electronic cigarette case or the electronic cigarette charger is cut off.

Otherwise, if the sampling voltage is with the range of the base-emitter threshold voltage, the triode PQ1 will be cut off and the collector of the triode PQ1 will be at a low level voltage, so that the grid of the MOSFET Q1 will be at a low level voltage and the MOSFET Q1 will be conductive, thus the powering path being get through.

Figure 4:
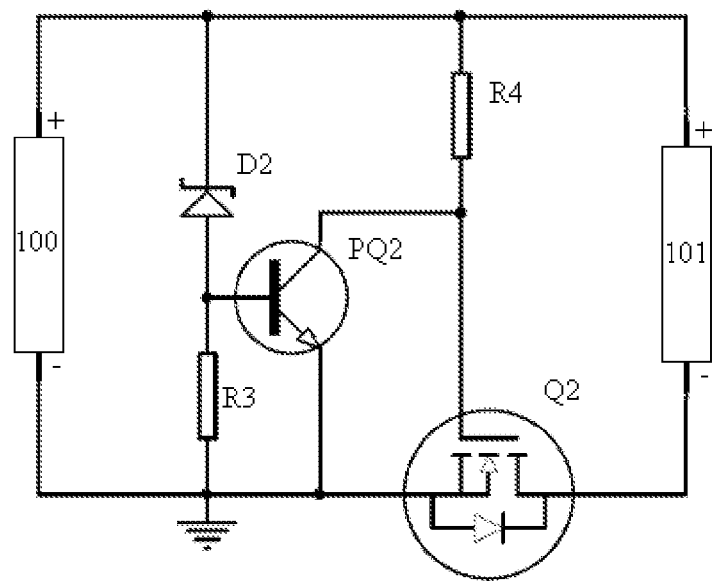
FIG. 4 is a circuit diagram for the circuit of over-voltage protection of the second embodiment of the present invention.

FIG. 4 is a circuit diagram for over-voltage protection circuit of the second embodiment of the present invention. In the second embodiment of the present invention, the voltage sampling circuit 102 comprises a resistance R3 and a voltage-regulator diode D2. The switch control circuit 103 comprises a triode PQ2 and a resistance R4. The switch circuit 104 comprises a MOSFET Q2. The MOSFET Q2 is an N channel MOSFET.

Wherein, one pin of the resistance R3 is respectively connected with the ground and the negative pole of the DC input terminal. And the other pin of the resistance R3 is connected with the base of the triode PQ2. The emitter of the triode PQ2 is respectively connected with the ground and the negative pole of the DC input terminal 101. The collector of the triode PQ2 is respectively connected with the grid of the MOSFET Q2 and the resistance R4.

The source of the MOSFET Q2 is respectively connected with the negative pole of the DC input terminal 101 and the emitter of the triode PQ2. The drain of the MOSFET Q2 is connected with the negative pole of the DC output terminal. The grid of the MOSFET Q2 is connected with one pin of the resistance R4. The other pin of the resistance R4 is respectively connected with the positive pole of the DC input terminal 100 and the negative pole of the DC-output terminal 101.

If the sampling voltage on the resistance R3 is over the base-emitter threshold voltage of the triode PQ2, the triode PQ2 is conductive to cut off the MOSFET Q2 so that the DC output terminal 101 won't be powered.

The negative pole of the voltage-regulator diode D2 is connected with the positive pole of the DC input terminal. The positive pole of the voltage-regulator diode D2 is respectively connected with the base of the triode Q2 and the resistance R3. The voltage-regulator diode D2 can make the voltage stable when the power supply or the load is changing to a substantial extent.

In the working process, the input of the direct current from the power supply produces a sampling voltage on the resistance R3 and the sampling voltage will be compared with the base-emitter threshold voltage (regarded as the preset voltage) by the NPN triode PQ2. If the sampling voltage is over the preset voltage, the sampling voltage will turn on the triode PQ2 and the collector of the triode PQ2 will be at a low level voltage. As a result, the grid of the MOSFET Q2 is at a low level voltage and the MOSFET Q2 is cut off, so that the powering path between the power supply and the electronic cigarette, the electronic cigarette case or the electronic cigarette charger is cut off.

Otherwise, if the sampling voltage is with the range of the preset voltage, the triode PQ2 will be cut off and the collector of the triode PQ2 will be at a high level voltage, so that the grid of the MOSFET Q2 will be at a high level voltage and the MOSFET Q2 will be conductive, thus the powering path being get through.

Figure 5:
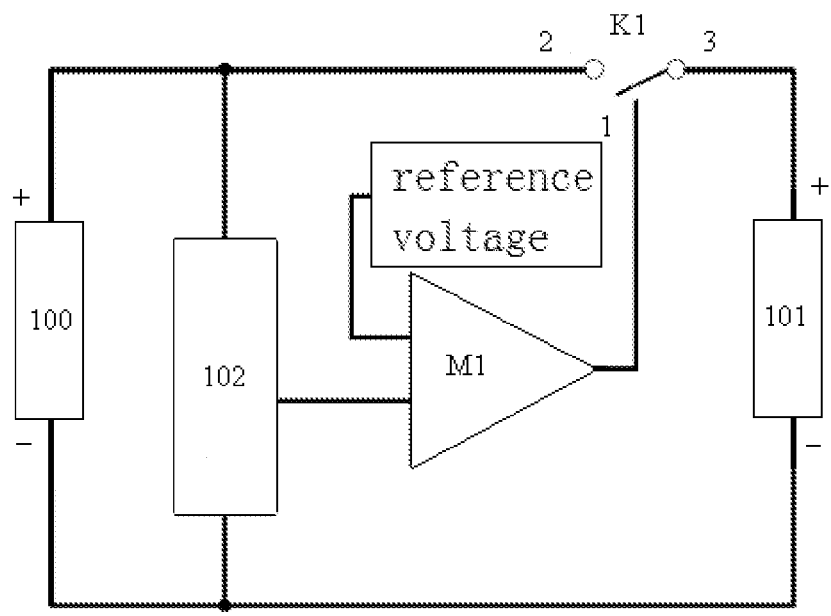
FIG. 5 is a circuit diagram for the circuit of over-voltage protection of the third embodiment of the present invention.

FIG. 5 is a circuit diagram for over-voltage protection circuit of the third embodiment of the present invention. In the third embodiment of the present invention, the switch control circuit 103 comprises a comparator M1. The comparator M1 may be LM393 or other comparators with similar properties such as an operational amplifier. The switch circuit 104 comprises a semiconductor switch K1. And said semiconductor switch K1 comprises a first pin, a second pin and a third pin. If the semiconductor switch K1 is a triode, said first pin is the triode's base, said second pin is the triode's emitter, and said third pin is the triode's collector. If said semiconductor switch is a thyristor, said first pin is the thyristor's gate pole, said second pin is the thyristor's positive pole, and said third pin is the thyristor's negative pole.

Wherein, the voltage sampling circuit 102 is connected with the DC input terminal. The first input of the comparator M1 is connected with a reference voltage, and the second input of the comparator M1 is connected with said voltage sampling circuit 102. The output of the comparator M1 is connected with the first pin of the semiconductor switch K1. The second pin of the semiconductor switch K1 is connected with the positive pole of the DC input terminal 100. And the third pin of the semiconductor switch K1 is connected with the positive pole of the DC-output terminal 101. The reference voltage can be set based on different comparators M1 to make sure that the comparator M1 can control to cut off the semiconductor switch K1 when the powering voltage is over the working voltage of the electronic cigarette, the electronic cigarette case or the electronic cigarette charger, and otherwise turn on the semiconductor switch K1.

In the third embodiment of the present invention, the skilled in the art can use any ordinary sampling circuit as the voltage sampling circuit 102. For example, a voltage sampling circuit 102 comprising resistances used to divide the voltage can be utilized.

In the working process, the comparator M1 compares the sampling voltage of the voltage sampling circuit 102 with the reference voltage. If the difference between the sampling voltage and the reference voltage is higher than a preset voltage value, the semiconductor switch K1 will be controlled to be cut off so that the DC output terminal won't be powered. Otherwise the semiconductor switch K1 will be controlled to be conductive so that the DC output terminal can power the electronic cigarette, the electronic cigarette case or the electronic cigarette charger.

The first and second embodiment of the present invention, the electronic cigarette, the electronic cigarette case or the electronic cigarette charger can be protected when the voltage of the power supply is exorbitant through the on and off of the triode and the MOSFET. Besides, the triode and the MOSFET in the present invention can be replaced by other devices with similar properties.

Figure 6:
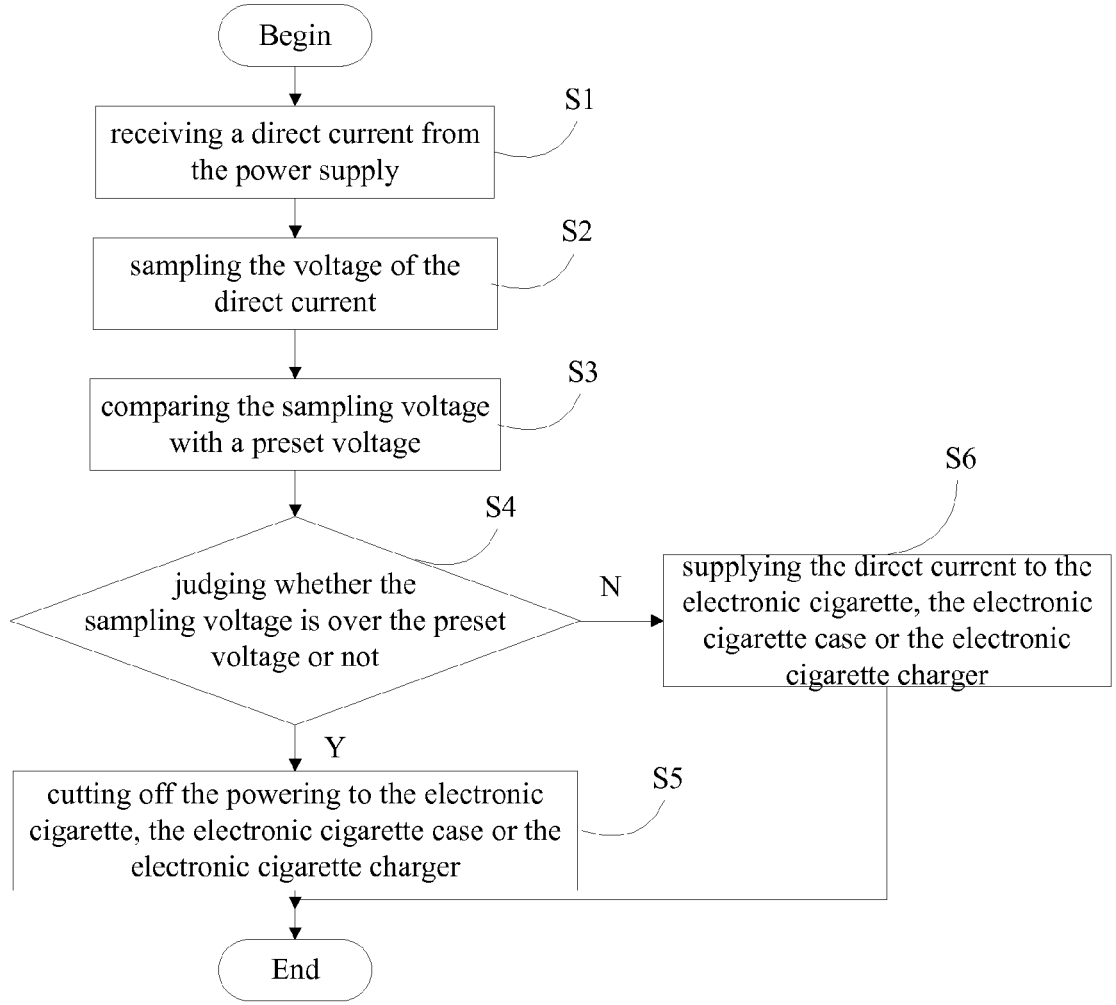
FIG. 6 is a flow chart of the method of over-voltage protection of the present invention.

FIG. 6 is a flow chart of the method of over-voltage protection of the present invention. This method comprises:

S1, receiving a direct current from the power supply.
S2, sampling the voltage of the direct current.
S3, comparing the sampling voltage with a preset voltage.
S4, judging whether the sampling voltage is over the preset voltage. If yes, turn
S5, otherwise turn to S6.
S5, cutting off the powering to the electronic cigarette, the electronic cigarette case or the electronic cigarette charger.
S6, supplying the direct current to the electronic cigarette, the electronic cigarette case or the electronic cigarette charger.

In the step S2, the voltage of the direct voltage input can be divided to produce the sampling voltage.

Through detecting the voltage of the power supply and the switch circuit controlling the powering path between the power supply and the electronic cigarette or the accessories thereof, the circuit and method of over-voltage protection in the present invention can prevent the power supply to provide an exorbitant voltage to the electronic cigarette, the electronic cigarette case or the electronic cigarette charger, thus protecting the electronic cigarette, the electronic cigarette case or the electronic cigarette charger from over-voltage and preventing them to be damaged by the exorbitant voltage. Besides, the reliability and safety of the electronic cigarette, the electronic cigarette case or the electronic cigarette charger can be improved.

While the present invention has been described with reference to preferred embodiments, however, the present invention is not limited to above-mentioned embodiments, those modifications, improvements and equivalent substitutions, which don't depart from the scope of the spirit and the principle of the present invention, should be included within the scope of the present invention.

The invention claimed is:

1. A circuit of over-voltage protection used to prevent a power supply to provide an exorbitant voltage to an electronic cigarette, an electronic cigarette case or an electronic cigarette charger, wherein said circuit comprises a DC input terminal, a DC output terminal, a voltage sampling circuit, a switch control circuit and a switch circuit; the voltage sampling circuit is electrically connected with the DC input terminal and the switch control circuit respectively; the switch control circuit is electrically connected with the switch circuit; the switch circuit is electrically connected with the DC input terminal, the DC output terminal and the switch control circuit respectively;

the DC input terminal is used to receive direct current from the power supply;
the DC output terminal is used to output direct current;
the voltage sampling circuit is used to sampling the voltage of the DC input terminal;
the switch control circuit is used to control the conductive or cutoff of the switch circuit;
the switch circuit is used to output the direct current from the DC input terminal to the DC output terminal or not based on the control of the switch control circuit;
wherein, said switch control circuit comprises a comparator; said switch circuit comprises a semiconductor switch; said semiconductor switch comprises a first pin, a second pin and a third pin;
a first input of said comparator is connected with a reference voltage, a second input of said comparator is directly connected with said voltage sampling circuit, and an output of said comparator is directly connected with the first pin of said semiconductor switch, the second pin of the semiconductor switch is directly connected with the positive pole of the DC input terminal, and the third pin of said semiconductor switch is directly connected with the positive pole of the DC output terminal;

if the voltage received by the second input of the comparator is over the reference voltage at the first input of the comparator, said comparator controls said semiconductor switch to be cut-off so that the DC output terminal can't be powered; and wherein the reference voltage can be set based on different electronic cigarettes, electronic cigarette cases or different electronic cigarette chargers.

2. The circuit of over-voltage protection according to claim 1, wherein, said semiconductor switch is a triode, said first pin is the base of the triode, said second pin is the emitter of the triode, and said third pin is the collector of the triode.

3. The circuit of over-voltage protection according to claim 1, wherein, said semiconductor switch is a thyristor, and said first pin is the gate pole of the thyristor, said second pin is the positive pole of the thyristor, and said third pin is the negative pole of the thyristor.

4. A method of over-voltage protection used to prevent a power supply to provide an exorbitant voltage to an electronic cigarette, an electronic cigarette case or an electronic cigarette charger, wherein, said method comprises:

using a DC input terminal to receive direct current from the power supply;

using a voltage sampling circuit to sample the voltage of said direct current;

using a comparator to compare said sampling voltage with a preset reference voltage;

wherein, said comparator is electrically connected with a semiconductor switch, a first input of said comparator is connected with the preset reference voltage, a second input of said comparator is directly connected with said voltage sampling circuit to receive the sampling voltage, and the output of said comparator is directly connected with a first pin of said semi-conductor switch, a second pin of the semiconductor switch is directly connected with the positive pole of the DC input terminal, and a third pin of said semiconductor switch is directly connected with the positive pole of a DC output terminal;

when the sampling voltage is over the preset voltage, said comparator controls said semiconductor switch to be cut-off to make power supply not to provide power to the electronic cigarette, the electronic cigarette case or the electronic cigarette charger; when the sampling voltage is within the range of the preset voltage, said comparator controls said semiconductor switch to be conductive to provide the direct current to the electronic cigarette, the electronic cigarette case or the electronic cigarette charger;

wherein the step of sampling the voltage of said direct current comprises dividing the voltage of the direct current input to produce said sampling voltage; and wherein the reference voltage can be set based on different electronic cigarettes, electronic cigarette cases or different electronic cigarette chargers.

* * * * *